(12) United States Patent
Iwata et al.

(10) Patent No.: US 6,328,391 B1
(45) Date of Patent: Dec. 11, 2001

(54) DRUM BRAKE DEVICE

(75) Inventors: Yukio Iwata; Hiroo Kobayashi; Toshifumi Maehara, all of Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/327,601

(22) Filed: Jun. 8, 1999

(30) Foreign Application Priority Data

Jun. 9, 1998 (JP) .................................................. 10-160710

(51) Int. Cl.[7] ................................. B60T 8/60; B60T 8/00
(52) U.S. Cl. .................... 303/116.1; 303/11; 303/DIG. 3; 303/DIG. 4; 303/10
(58) Field of Search ............................. 303/10, 11, 116.1, 303/113.4

(56) References Cited

U.S. PATENT DOCUMENTS

| 4,043,607 | * | 8/1977 | Signorelli et al. ..................... 303/100 |
| 4,674,804 | * | 6/1987 | Burgdorf et al. ..................... 303/6 R |
| 4,872,731 | * | 10/1989 | Nakamura ............................... 303/93 |
| 5,669,678 | * | 9/1997 | Stumpe et al. ......................... 303/155 |
| 5,806,938 | * | 9/1998 | Stumpe et al. ......................... 303/155 |

FOREIGN PATENT DOCUMENTS

| 40 24811 A1 | | 2/1992 | (DE) . |
| 59128037 | | 7/1984 | (JP) . |
| 61129328 | * | 6/1986 | (JP) . |
| B-2-46424 | | 10/1990 | (JP) . |
| 04088803 | * | 3/1992 | (JP) . |
| 10061698 | * | 3/1998 | (JP) . |
| WO 9221542 | * | 12/1992 | (WO) . |

* cited by examiner

*Primary Examiner*—Robert J. Oberleitner
*Assistant Examiner*—Melody M. Burch
(74) *Attorney, Agent, or Firm*—Morgan, Lewis & Bockius LLP

(57) ABSTRACT

A drum brake device produces a stable braking force at a predetermined boosting ratio in response to a brake operation force input thereto, even if the friction characteristics of the interface of the brake drum and the brake shoe varies, without increasing the size of the wheel cylinder. The drum brake device includes an input detector that detects a hydraulic braking pressure output from a master cylinder, and produces a signal representative of the detected hydraulic braking pressure as an input force to the drum brake device; an output detector that detects an anchor reaction force generated at the time of braking and produces a signal representative of the detected anchor reaction force as an output force of the drum brake device; electromagnetic valves capable of controlling the supply of a hydraulic braking pressure supplied from the master cylinder to a wheel cylinder; and a control circuit that controls the operations of the electromagnetic valves in accordance with output signals of the input detector and the output detector so that the output force is limited to a force equal to or smaller than a force defined by a predetermined boosting ratio.

6 Claims, 3 Drawing Sheets

DRUM BRAKE DEVICE

This application claims the benefit of Japanese Application No. Hei. 10-160710 filed Jun. 9, 1998, which is hereby incorporated by reference.

BACKGROUND OF THE INVENTION

1. Field of the Invention

The present invention relates to a drum brake device which is based on feedback control, and is able to constantly produce a stable braking force irrespective of the state of a brake friction surface, and is further adaptable for use in both an anti-lock braking system and a traction control system.

2. Discussion of the Related Art

Drum brake devices are widely employed in vehicle braking systems. A major reason for the drum brake device's use is its ability to automatically amplify a braking force (referred to as a self-amplifying function), as is observed in the uni-servo or duo-servo brake devices. This self-amplifying ability lessens the required brake operation force (e.g., a brake pedal depression force). However, this self-amplifying operation of the drum brake device is unstable. A proportional constant, which defines a relationship between a pedal depressing force and a final braking force, is very sensitive to the friction coefficient of the interface between the brake drum and the brake shoe. In cases where the inner surface of the brake drum is rusted after the vehicle travels in the rain, the wheels will be abruptly locked by applying an extremely small depression to the brake pedal.

To remove this defect, it is essential that the drum brake device have the ability to constantly produce a stable braking force at a predetermined boosting ratio in response to a brake operation force, even if the frictional characteristic of the interface between the brake drum and the brake shoe varies. One solution to this problem was proposed in JP-B-2-46424. The technique of this publication will be described with reference to FIGS. 2 and 3.

As shown, a drum brake device 1 is made up of a pair of brake shoes 3 and 4, a wheel cylinder 6, a link member 8, a master cylinder 12, and a fluid passage 13. In the drum brake device 1, the wheel cylinder 6 is improved to produce a stable braking force. The brake shoes 3 and 4 are oppositely disposed within an inner space of a cylindrical brake drum 2. The wheel cylinder 6, disposed between the opposed ends of brake shoes 3 and 4, is used for expanding the ends of the brake shoes 3 and 4 so that they come into engagement with the inner surface of the brake drum. The link member 8 mutually links the other ends of the brake shoes 3 and 4, and receives an anchor reaction force of one of the brake shoes 3 and 4 and transmits it to the other brake shoe. The master cylinder 12 generates a hydraulic braking pressure that corresponds in magnitude to a brake operation force F1 (a depression force applied to a brake pedal 10). The hydraulic braking pressure generated by the master cylinder 12 is introduced into the wheel cylinder 6 through the fluid passage 13.

Details of the wheel cylinder 6 are illustrated in FIG. 3. As shown, a cylinder body 17 includes a first cylinder 17a and a second cylinder 17b. These cylinders (17a and 17b) are integrally formed, with the former (17a) being located below the latter (17b). The first cylinder 17a contains a slidable drive piston 15. The second cylinder 17b contains a slidable control piston 16. A hydraulic braking pressure is transmitted from the fluid passage 13 to a pressure chamber 20 via a control chamber 19. The control chamber 19 is formed in the second cylinder 17b while the pressure chamber 20 is formed in the first cylinder 17a. The tip of the drive piston 15 contacts the primary shoe 3, and presses the primary shoe 3 against the brake drum 2 by a thrust force P1. Thrust force P1 corresponds to the hydraulic braking pressure supplied to the pressure chamber 20.

The tip of the control piston 16, which is in contact with the end of the secondary shoe 4, receives an anchor reaction force P2 from the secondary shoe 4 while the base end of the control piston 16 receives a hydraulic braking pressure supplied to the control chamber 19. When an urging force corresponding to the anchor reaction force P2 exceeds an urging force P3 caused by the hydraulic braking pressure, the control piston 16 is displaced toward the control chamber 19. Further, a valve body 24 is provided within the control chamber 19. The valve body is used for opening and closing a communicating passage 22 which communicates the control chamber 19 with the pressure chamber 20. When the control piston 16 is displaced toward the control chamber 19, the communicating passage 22 is closed with the valve body 24.

When the urging force P3 (caused by the hydraulic braking pressure from the master cylinder 12) is imparted or input to the control piston 16, and the anchor reaction force P2 is varied to a force defined by a predetermined boosting ratio, the control piston 16 is displaced toward the control chamber 19 to stop the supply of the hydraulic braking pressure to the pressure chamber 20. As a result, the thrust force P1 of the drive piston 15 is kept constant, a further increase of the anchor reaction force is prevented, and the braking force is stabilized.

In the conventional drum brake device mentioned above, the mechanism for controlling the anchor reaction force is incorporated into the wheel cylinder 6. However, this type of drum brake device has the following problem. The structure of the brake device increases the size of the wheel cylinder 6. The increase of the cylinder size makes it difficult to assemble the wheel cylinder 6 into the brake device of a small-size vehicle that has a brake drum with a small inner space. Additionally, the increased cylinder size further increases the weight of the brake device with the wheel cylinder assembled thereinto. For this reason, the conventional drum brake device which employs the unique mechanism for achieving braking force stabilization has found limited use in small-size vehicles. It is almost impossible to apply a common conventional drum brake device to various types of vehicles. Specifically, vehicles differ in body weight and in anchor reaction forces of the drum brake devices assembled thereinto. Accordingly, an object of the present invention is to provide a drum brake device which produces a stable braking force at a predetermined boosting ratio in response to a brake operation force input thereto, even if the frictional characteristics of the interface of the brake drum and the brake shoe varies. Additionally, the aforementioned object should be realized without increasing the device size. Furthermore, the drum brake device should be suitably applicable to a small-size vehicle having a brake drum with a small inner space.

SUMMARY OF THE INVENTION

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a drum brake device, comprising a brake drum; a pair of brake shoes oppositely disposed within the brake drum, each of the pair of brake shoes having a first end and a second end; a wheel cylinder for expanding the brake shoes, the wheel cylinder being disposed between the first ends of the brake shoes, and the second ends of the brake shoes being connected; a master cylinder outputting a hydraulic braking pressure; a fluid passage for introducing the hydraulic braking pressure output from the master cylinder to the wheel cylinder, the hydraulic braking pressure being dependent on a brake operation force; an input detector, coupled to the fluid passage, that detects the hydraulic braking pressure output from the master cylinder and produces a first output signal representative of the detected hydraulic braking pressure, the hydraulic braking pressure being an input force to one of the pair of brake shoes; an output detector that detects an anchor reaction force generated by the other one of the pair of brake shoes during braking and produces a second output signal representative of the detected anchor reaction force, the detected anchor reaction force being an output force of the other one of the pair of brake shoes; electromagnetic valves, coupled to the fluid passage, that control the supply of the hydraulic braking pressure output from the master cylinder to the wheel cylinder; and a control circuit that controls the operations of the electromagnetic valves in accordance with the first and second output signals so that the output force is limited to a force equal to or smaller than the input force multiplied by a predetermined boosting ratio.

In another aspect of the present invention, there is provided a drum brake device, comprising a brake drum; a pair of brake shoes oppositely disposed within the brake drum, each of the pair of brake shoes having a first end and a second end; a wheel cylinder for expanding the brake shoes, the wheel cylinder being disposed between the first ends of the brake shoes; a master cylinder outputting a hydraulic braking pressure; a fluid passage for introducing the hydraulic braking pressure output from the master cylinder to the wheel cylinder, the hydraulic braking pressure being dependent on a brake operation force; input detecting means, coupled to the fluid passage, for detecting the hydraulic braking pressure output from the master cylinder and producing a first output signal representative of the detected hydraulic braking pressure, the hydraulic braking pressure being an input force to the drum brake device; output detecting means for detecting an anchor reaction force generated during braking and producing a second output signal representative of the detected anchor reaction force, the detected anchor reaction force being an output force of the drum brake device; electromagnetic valves, coupled to the fluid passage, that control the supply of the hydraulic braking pressure output from the master cylinder to the wheel cylinder; and a control circuit that controls the operations of the electromagnetic valves in accordance with the first and second output signals so that the output force is limited to a force equal to or smaller than a force defined by a predetermined boosting ratio of the output force to the input force.

In yet another aspect of the present invention, there is provided a drum brake device, comprising a brake drum; a pair of brake shoes oppositely disposed within the brake drum, each of the pair of brake shoes having a first end and a second end, and the second ends of the pair of brake shoes being linked together; a wheel cylinder for expanding the brake shoes, the wheel cylinder being disposed between the first ends of the brake shoes; a master cylinder outputting a hydraulic pressure; a fluid passage for introducing the hydraulic braking pressure output from the master cylinder to the wheel cylinder, the hydraulic braking pressure being dependent on a brake operation force; an input detector coupled to the fluid passage, the input detector detecting the hydraulic braking pressure output from the master cylinder and producing a first output signal representative of the detected hydraulic braking pressure, the hydraulic braking pressure being an input force to the drum brake device; an output detector that detects an anchor reaction force generated during braking and produces a second output signal representative of the detected anchor reaction force, the detected anchor reaction force being an output force of the drum brake device; electromagnetic valves, coupled to the fluid passage, that control the supply of the hydraulic braking pressure output from the master cylinder to the wheel cylinder; and a control circuit that controls the operations of the electromagnetic valves in accordance with the first and second output signals so that the output force is limited to a force equal to or smaller than the input force multiplied by a predetermined boosting ratio.

It is to be understood that both the foregoing general description and the following detailed description are exemplary and explanatory and are intended to provide further explanation of the invention.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
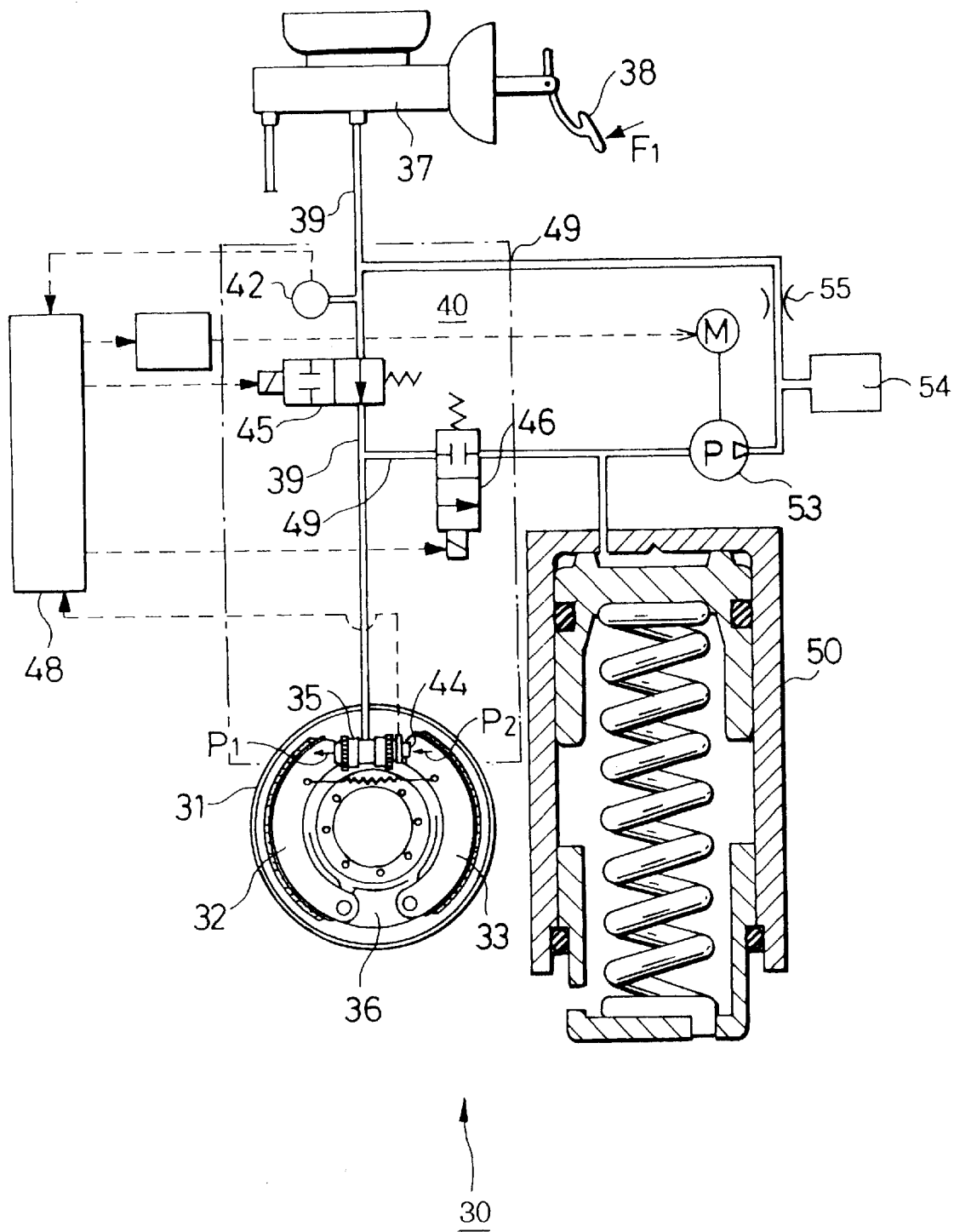
FIG. 1 is a diagram showing an embodiment of the drum brake device of the present invention.
Figure 2:
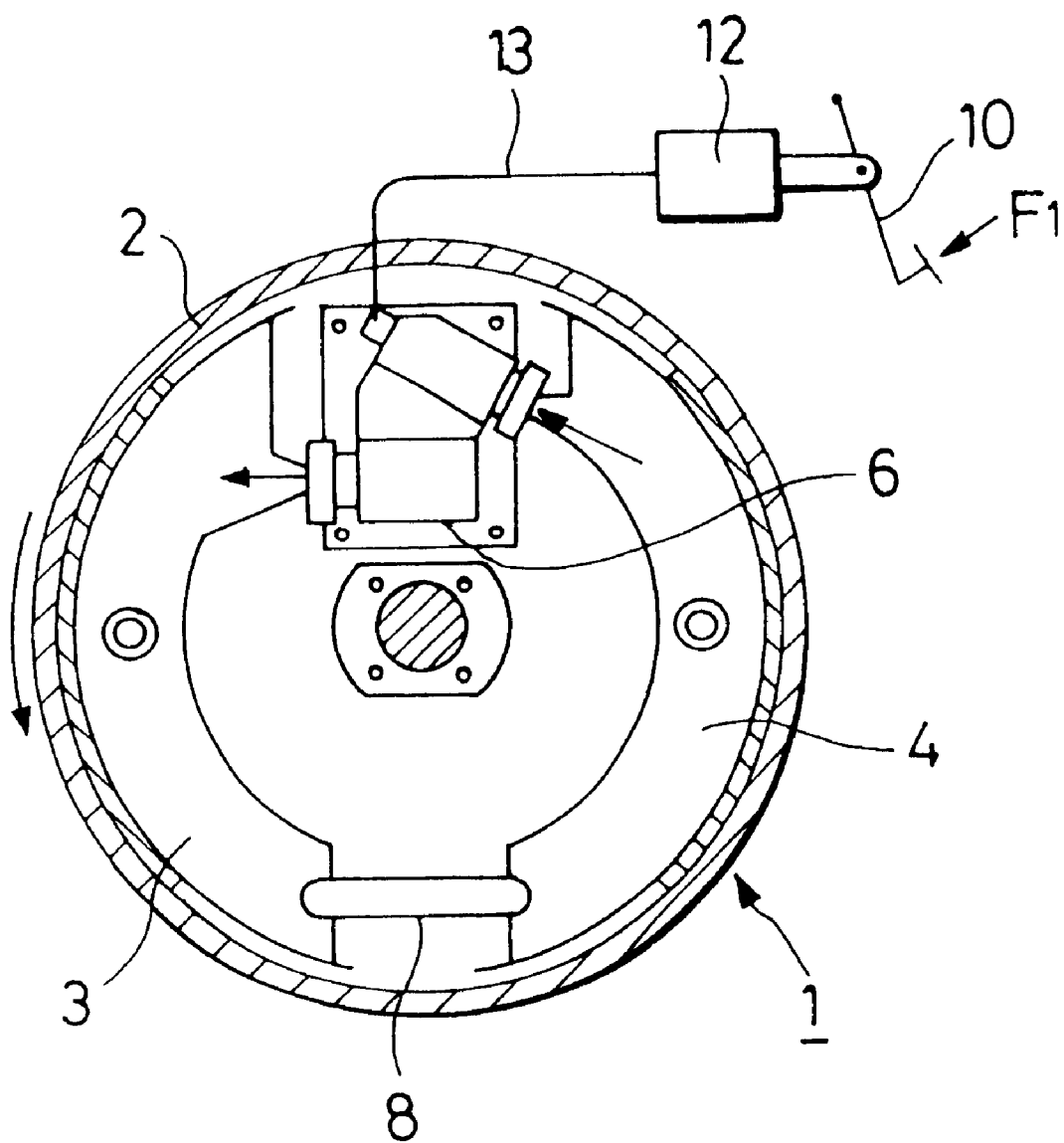
FIG. 2 is a diagram schematically showing a conventional drum brake device.
Figure 3:
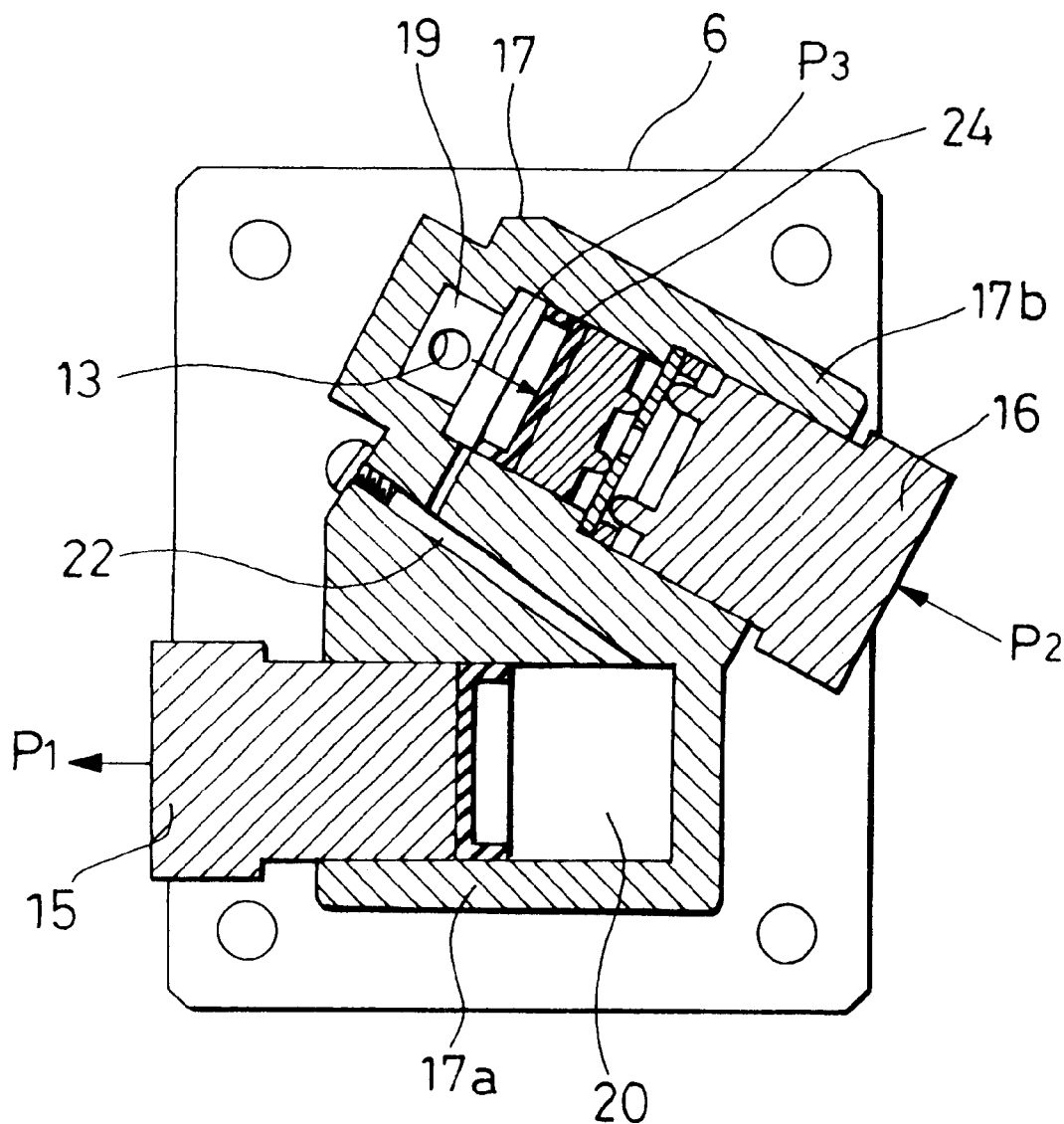
FIG. 3 is an enlarged view showing a wheel cylinder in the conventional drum brake device shown in FIG. 2.

FIG. 1 is a diagram showing an embodiment of the drum brake device of the present invention. As shown, a drum brake device 30 is made up of a pair of primary and secondary shoes (32 and 33), a wheel cylinder 35, a link member 36, a master cylinder 37, a fluid passage 39, and braking-force stabilizing mechanism 40. The brake shoes 32 and 33 are oppositely disposed within an inner space of a cylindrical brake drum 31. The wheel cylinder 35, disposed between opposed ends of the brake shoes 32 and 33, is used for expanding the ends of the brake shoes 32 and 33 so as to come into engagement with the inner surface of the brake drum. The link member 36 mutually links the other ends of the brake shoes 32 and 33, and receives an anchor reaction force of one of the brake shoes 32 and 33 and transmits it to the other brake shoe. The master cylinder 37 generates a hydraulic braking pressure corresponding in magnitude to a brake operation force F1 (a depression force applied to a brake pedal 38). The hydraulic braking pressure generated by the master cylinder 37 is introduced into the wheel cylinder 35 through the fluid passage 39.

The braking-force stabilizing mechanism 40 controls the anchor reaction force. The braking-force stabilizing mechanism 40 includes input detector 42, output detector 44, electromagnetic valves 45 and 46, and a control circuit 48. The input detector 42, which is coupled to the fluid passage 39, detects a hydraulic braking pressure supplied to the wheel cylinder 35 (which expands the brake shoes 32 and 33), produces a signal representative of the detected hydraulic braking pressure, and inputs it as an input force to the control circuit 48. The output detector 44 is in contact with the anchor end of the secondary shock 33 which is located closer to the wheel cylinder. Output detector 44 detects an anchor reaction force generated at the time of braking and produces a signal representative of the detected anchor force and outputs it as an output force to the control circuit 48. The electromagnetic valves 45 and 46, coupled to the fluid passage 39, are used for controlling a hydraulic braking pressure supplied to the wheel cylinder 35. The control circuit 48 controls the operations of the electromagnetic valves 45 and 46 (the electromagnetic valve 46 will be described in detail later) in accordance with the output signals of the input detector 42 and the output detector 44.

In the embodiment, the input detector 42 takes the form of a pressure sensor which senses a hydraulic braking pressure in the fluid passage 39 and outputs it in the form of an electrical signal. The output detector 44 takes the form of a strain gauge which detects a quantity of a movement of the secondary shoe 33 when it is angularly moved by the received anchor reaction force. The electromagnetic valve 45 is a 2-position switch valve for opening and closing the fluid passage 39. The electromagnetic valve 46 is a 2-position switch valve for opening and closing a by-pass passage 49 connecting to the fluid passage 39. One end of the by-pass passage 49 communicatively connects to a part of the fluid passage 39, located between the input detector 42 and the master cylinder 37. The other end of the by-pass passage 49 communicatively connects to a part of the fluid passage 39, located between the electromagnetic valve 45 and the wheel cylinder 35.

A damper cylinder 50, a pump 53, an accumulator 54, and an orifice 55 are coupled to the by-pass passage 49. The damper cylinder 50 receives a fluid flowing from the fluid passage 39 into the by-pass passage 49 via the electromagnetic valve 46. The pump 53 returns the operation fluid from the damper cylinder 50 to the fluid passage 39 in response to a control signal received from the control circuit 48 when the brake pedal is released from its depressed state. The accumulator 54 dumps a pulsation of the operation fluid generated when the pump is driven. The orifice 55 restricts a flow of the operation fluid flowing from a part of the fluid passage 39, which is located closer to the master cylinder 37, to the by-pass passage 49.

The control circuit 48 processes the output signals of the input detector 42 and the output detector 44 in accordance with a procedure as an implementation of a predetermined algorithm. The control circuit 48 produces control signals in accordance with the result of the processing, and outputs them to the electromagnetic valves 45 and 46 and the pump 53. Further, the control circuit 48 controls the electromagnetic valves 45 and 46 so that the anchor reaction force P2 detected by the output detector 44 is limited to a force equal to or smaller than a force defined by a predetermined boosting ratio of the thrust force P1 (input from the wheel cylinder 35 to the primary shoe 32). The thrust force P1 of the wheel cylinder 35 depends on the output signal of the input detector 42.

More specifically, when the thrust force P1 is input from the wheel cylinder 35 to the primary shoe 32, and the anchor reaction force P2 is varied to a force defined by a predetermined boosting ratio, the control circuit 48 drives the electromagnetic valve 45 to close the fluid passage 39 and to stop the supply of the hydraulic braking pressure to the wheel cylinder 35. As a result of stopping the supply of the hydraulic braking pressure from the fluid passage 39 to the wheel cylinder 35, an increase of the anchor reaction force is restricted.

In cases where a further decrease of the anchor reaction force is required in a state that the electromagnetic valve 45 stops the hydraulic braking pressure supply to the wheel cylinder 35, the electromagnetic valve 46 is opened to set up a communication between the wheel cylinder 35 and the damper cylinder 50. Then, the hydraulic braking pressure is released from the wheel cylinder 35 to the damper cylinder 50, whereby the hydraulic braking pressure in the wheel cylinder 35 is reduced.

An operation of the drum brake device 30 thus constructed will be described. The input detector 42 detects a hydraulic braking pressure (that depends on a brake operation force) supplied to the wheel cylinder 35, produces an output signal representative of an input force to the brake device, and applies it to the control circuit 48. The output detector 44 detects an anchor reaction force generated at the time of braking, produces an output signal representative of an output force of the brake device, and applies it to the control circuit 48. The control circuit 48 monitors a ratio of the input force and the output force while receiving those force representative signals, controls the operations of the electromagnetic valves 45 and 46 in accordance with the ratio, and hence controls the hydraulic braking pressure supply to the wheel cylinder 35. Thus, the anchor reaction force or the output force is limited to a force equal to or smaller than a force defined by a predetermined boosting ratio.

To apply the drum brake devices of the invention to different types of vehicles of different weights, a designer need only set the boosting ratio in advance at values appropriate to those types of vehicles. Thus, the drum brake device of the invention may readily be applied to various types of vehicles. Further, the drum brake device can produce a stable braking force even in situations where the frictional characteristic of the interface between the cylindrical brake drum 31 and the brake shoes 32 and 33 varies.

In the drum brake device of the invention, the control of the anchor reaction force is carried out in such a manner that the hydraulic braking pressure supply to the wheel cylinder 35 is controlled by use of the electromagnetic valves 45 and 46. In other words, the special mechanism for controlling the anchor reaction force is not assembled into the wheel cylinder 35. Therefore, there is no increase of the size of the wheel cylinder 35. A strain gauge is located between the wheel cylinder 35 and the secondary shoe 33, and is used as the output detector 44 for detecting the anchor reaction force. Since the stain gauge is compact in size, it requires less space when it is attached to the brake assembly.

From this, it is readily understood that the drum brake device of the invention finds application in small-size vehicles that have brake drums with smaller inner spaces. It is apparent that any means other than a strain gauge may be used as the output detector 44 so long as it has an ability to detect the anchor reaction force. For example, a sensor element capable of sensing a mechanical strength and reproducing it in the form of an electrical signal may be used as output detector 44. Another example is to place a sensor element, like the input sensor, for sensing a hydraulic braking pressure in the control chamber that receives the anchor reaction force.

The above-mentioned embodiment obtains the input force input to the wheel cylinder 35 through the detection of the hydraulic braking pressure by use of the input detector 42. Alternatively, the input force may be obtained in the form of a quantity of stroke of the depressed brake pedal, which is proportional to a thrust force. In this case, a position sensor may be used for sensing the stroke quantity. The position sensor produces an electrical signal corresponding in amplitude to the sensed stroke quantity.

It is preferable that the brake control performed by the control circuit 48 in the drum brake device is integrated into an anti-lock braking system or a traction control system. If this is done, the hydraulic braking pressure supplied to the wheel cylinder can be controlled (i.e., increased or decreased) through the control of the electromagnetic valves, and in accordance with accidental vehicle behaviors. In this manner, the drum brake device stabilizes the vehicle motion.

The above-mentioned embodiment uses two electromagnetic valves for controlling the hydraulic braking pressure supply to the wheel cylinder. A 3-position switch electromagnetic valve, if used instead, will reduce the required number of the valves. Further, the damper cylinder 50, the pump 53, the accumulator 54 and the orifice 55, which are coupled to the by-pass passage 49, may be modified and changed within the scope of the invention. It is also evident that the present invention is applicable to any other brake device having a self-amplifying function.

As seen from the foregoing description, in the drum brake device of the present invention, the control circuit monitors a ratio of the input force detected by the input detector and the output force detected by the output detector, and controls the operations of the electromagnetic valves. The electromagnetic valves are coupled to the fluid passage connecting the master cylinder to the wheel cylinder so that the output force is limited to a force equal to or smaller than a force defined by a predetermined boosting ratio. The boosting force is defined in connection with the input force that is input from the wheel cylinder to the brake shoe.

The drum brake device can produce a stable braking force at a predetermined boosting ratio even in a situation where the frictional characteristic of the interface between the cylindrical brake drum and the brake shoes varies. Therefore, stable braking torques are constantly maintained. The drum brake device may also operate to block vehicle behaviors in an accidental situation so as to stabilize the vehicle motion.

Further, the control of the anchor reaction force is carried out in a manner such that the hydraulic braking pressure supply to the wheel cylinder is controlled by use of the electromagnetic valves. In other words, the special mechanism for controlling the anchor reaction force is not assembled into the wheel cylinder. As a result, there is no increase of the size of the wheel cylinder. Hence, the drum brake device of the invention finds application in small-size vehicles having brake drums with small inner spaces.

What is claimed is:

1. A drum brake device, comprising:
   a brake drum;
   a pair of brake shoes comprising a primary brake shoe and a secondary brake shoe oppositely disposed within the brake drum, each of the pair of brake shoes having a first end and a second end;
   a wheel cylinder for expanding the brake shoes, the wheel cylinder being disposed between the first ends of the brake shoes, and the second ends of the brake shoes being connected;
   a master cylinder outputting a hydraulic braking pressure;
   a fluid passage for introducing the hydraulic braking pressure output from the master cylinder to the wheel cylinder, the hydraulic braking pressure being dependent on a brake operation force;
   an input detector, coupled to the fluid passage, that detects the hydraulic braking pressure output from the master cylinder and produces a first output signal representative of the detected hydraulic braking pressure, the hydraulic braking pressure being an input force to the brake shoes,
   an output detector that detects an anchor reaction force generated by the secondary brake shoe during braking and produces a second output signal representative of the detected anchor reaction force, the detected anchor reaction force being an output force of the secondary brake shoe;
   electromagnetic valves, coupled to the fluid passage, that control the supply of the hydraulic braking pressure output from the master cylinder to the wheel cylinder; and
   a control circuit that controls the operations of the electromagnetic valves in accordance with the first and second output signals so that the output force is limited to a force equal to or smaller than the input force multiplied by a predetermined boosting ratio.

2. A drum brake device according to claim 1, wherein the predetermined boosting ratio is adjustable, and is preset at a value appropriate to the type of vehicle into which it is installed.

3. A drum brake device, comprising:
   a brake drum;
   a pair of brake shoes comprising a primary brake shoe and a secondary brake shoe oppositely disposed within the brake drum, each brake shoe of the pair of brake shoes having a first end and a second end;
   a wheel cylinder for expanding the brake shoes, the wheel cylinder being disposed between the first ends of the brake shoes;
   a master cylinder outputting a hydraulic braking pressure;
   a fluid passage for introducing the hydraulic braking pressure output from the master cylinder to the wheel cylinder, the hydraulic braking pressure being dependent on a brake operation force;
   input detecting means, coupled to the fluid passage, for detecting the hydraulic braking pressure output from the master cylinder and producing a first output signal representative of the detected hydraulic braking pressure, the hydraulic braking pressure being an input force to the brake shoes;
   output detecting means for detecting an anchor reaction force generated by the secondary brake shoe during braking and producing a second output signal representative of the detected anchor reaction force, the detected anchor reaction force being an output force of the secondary brake shoe;
   electromagnetic valves, coupled to the fluid passage, that control the supply of the hydraulic braking pressure output from the master cylinder to the wheel cylinder; and
   a control circuit that controls the operations of the electromagnetic valves in accordance with the first and second output signals so that the output force is limited to a force equal to or smaller than a force defined by a predetermined boosting ratio of the output force to the input force.

4. A drum brake device according to claim 3, wherein the predetermined boosting ratio is adjustable, and is preset at a value appropriate to the type of vehicle into which it is installed.

5. A drum brake device, comprising:

a brake drum;

a pair of brake shoes comprising a primary brake shoe and a secondary brake shoe oppositely disposed within the brake drum, each of the pair of brake shoes having a first end and a second end, and the second ends of the pair of brake shoes being linked together;

a wheel cylinder for expanding the brake shoes, the wheel cylinder being disposed between the first ends of the brake shoes;

a master cylinder outputting a hydraulic pressure;

a fluid passage for introducing the hydraulic braking pressure output from the master cylinder to the wheel cylinder, the hydraulic braking pressure being dependent on a brake operation force;

an input detector coupled to the fluid passage, the input detector detecting the hydraulic braking pressure output from the master cylinder and producing a first output signal representative of the detected hydraulic braking pressure, the hydraulic braking pressure being an input force to the brake shoes;

an output detector that detects an anchor reaction force generated by the secondary brake shoe during braking and produces a second output signal representative of the detected anchor reaction force, the detected anchor reaction force being an output force of the secondary brake shoe;

electromagnetic valves, coupled to the fluid passage, that control the supply of the hydraulic braking pressure output from the master cylinder to the wheel cylinder; and a control circuit that controls the operations of the electromagnetic valves in accordance with the first and second output signals so that the output force is limited to a force equal to or smaller than the input force multiplied by a predetermined boosting ratio.

6. A drum brake device according to claim 5, wherein the predetermined boosting ratio is adjustable, and is preset at a value appropriate to the type of vehicle into which it is installed.

* * * * *